United States Patent
Ohno et al.

(10) Patent No.: US 11,262,515 B2
(45) Date of Patent: Mar. 1, 2022

(54) OPTICAL FIBER CABLE AND METHOD FOR MANUFACTURING OPTICAL FIBER CABLE

(71) Applicant: FUJIKURA LTD., Tokyo (JP)

(72) Inventors: Masatoshi Ohno, Sakura (JP); Shinnosuke Sato, Sakura (JP); Mizuki Isaji, Sakura (JP); Kouji Tomikawa, Sakura (JP); Akira Namazue, Sakura (JP); Ken Osato, Sakura (JP)

(73) Assignee: FUJIKURA LTD., Tokyo (JP)

( * ) Notice: Subject to any disclaimer, the term of this patent is extended or adjusted under 35 U.S.C. 154(b) by 375 days.

(21) Appl. No.: 16/340,626

(22) PCT Filed: Nov. 17, 2017

(86) PCT No.: PCT/JP2017/041471
§ 371 (c)(1),
(2) Date: Apr. 9, 2019

(87) PCT Pub. No.: WO2018/092880
PCT Pub. Date: May 24, 2018

(65) Prior Publication Data
US 2021/0278616 A1  Sep. 9, 2021

(30) Foreign Application Priority Data
Nov. 17, 2016 (JP) .............................. JP2016-224005

(51) Int. Cl.
*G02B 6/44* (2006.01)
(52) U.S. Cl.
CPC .......... *G02B 6/443* (2013.01); *G02B 6/4486* (2013.01)

(58) Field of Classification Search
CPC ................................................... G02B 6/4433
See application file for complete search history.

(56) References Cited

U.S. PATENT DOCUMENTS 5,970,196 A * 10/1999 Greveling ............ G02B 6/4404
385/100
6,041,153 A    3/2000 Yang
(Continued)

FOREIGN PATENT DOCUMENTS

CN    201654301 U * 11/2010
JP    H0320704 A    1/1991
(Continued)

OTHER PUBLICATIONS

Japanese Office Action issued in corresponding Japanese Application No. 2016-224005; dated Nov. 14, 2017 (4 pages).

*Primary Examiner* — Charlie Y Peng
(74) *Attorney, Agent, or Firm* — Osha Bergman Watanabe & Burton LLP

(57) ABSTRACT

An optical fiber cable includes a core that includes an assembled plurality of optical fibers; an inner sheath that accommodates the core therein, a pair of tension members that are embedded in the inner sheath and that are disposed on opposite sides of the core, and an outer sheath that covers the inner sheath. The inner sheath is formed with a dividing portion that divides an inner peripheral surface and an outer peripheral surface of the inner sheath in a circumferential direction. The dividing portion extends along a longitudinal direction in which the optical fiber cable extends.

12 Claims, 10 Drawing Sheets

(56) References Cited

U.S. PATENT DOCUMENTS

| | | | | |
|---|---|---|---|---|
| 6,101,305 A | * | 8/2000 | Wagman | G02B 6/4433 |
| | | | | 385/113 |
| 6,760,522 B2 | * | 7/2004 | Okada | G02B 6/4495 |
| | | | | 385/109 |
| 7,289,704 B1 | * | 10/2007 | Wagman | G02B 6/4429 |
| | | | | 385/100 |
| 8,582,939 B2 | * | 11/2013 | Gimblet | B29C 48/34 |
| | | | | 385/100 |
| 2002/0126970 A1 | * | 9/2002 | Anderson | G02B 6/4433 |
| | | | | 385/113 |
| 2002/0159727 A1 | | 10/2002 | Okada et al. | |

FOREIGN PATENT DOCUMENTS

| | | |
|---|---|---|
| JP | H04147204 A | 5/1992 |
| JP | H10-197765 A | 7/1998 |
| JP | 2002098870 A | 4/2002 |
| JP | 2002098871 A | 4/2002 |
| JP | 2002328277 A | 11/2002 |
| JP | 2002350695 A | 12/2002 |
| JP | 2006047390 A | 2/2006 |
| JP | 2007011018 A | 1/2007 |
| JP | 2007114700 A | 5/2007 |
| JP | 2007115636 A | 5/2007 |
| JP | 2007147759 A | 6/2007 |
| JP | 2010008923 A | 1/2010 |
| JP | 2011141315 A | 7/2011 |
| JP | 2012108276 A | 6/2012 |
| JP | 2012226024 A | 11/2012 |
| JP | 2013-083830 A | 5/2013 |
| JP | 2013228647 A | 11/2013 |
| JP | 2015099315 A | 5/2015 |
| JP | 2015215533 A | 12/2015 |
| JP | 2016177116 A | 10/2016 |

* cited by examiner

OPTICAL FIBER CABLE AND METHOD FOR MANUFACTURING OPTICAL FIBER CABLE

BACKGROUND

One or more embodiments of the present invention relate to an optical fiber cable and a method for manufacturing an optical fiber cable.

Priority is claimed on Japanese Patent Application No. 2016-224005, filed on Nov. 17, 2016, the content of which is incorporated herein by reference.

In the related art, an optical fiber cable as disclosed in Patent Document 1 described below has been known. The optical fiber cable includes a core in which a plurality of optical fiber element wires or optical fiber core wires (hereinafter referred to simply as "optical fibers") are assembled, an inner sheath that accommodates the core inside, a pair of wire bodies and a pair of tension members, which are embedded in the inner sheath, and an outer sheath that covers the inner sheath.

In this configuration, the core is doubly covered with the inner sheath and the outer sheath, which makes it possible to effectively protect the optical fiber from external force and the like.

PRIOR ART DOCUMENTS

[Patent Document 1] Japanese Unexamined Patent Application, First Publication No. 2015-215533

SUMMARY

Incidentally, with this type of optical fiber cable, an operation of drawing out the optical fiber (hereinafter referred to as "draw-out-operation") may be performed at the time of disassembling the optical fiber cable or connecting the optical fiber after the installation.

In the optical fiber cable having the configuration of Patent Document 1 described above, when performing a draw-out-operation, the outer sheath and the inner sheath are incised with a tool such as a blade, the wire body is partially drawn out, and the inner sheath and outer sheath are torn by pulling the wire body in the longitudinal direction. Here, in order to secure the strength of the optical fiber cable, if the thicknesses of the inner sheath and the outer sheath are increased or these sheaths are formed using a hard material, it is necessary to pull the wire bodies with a large force, so the burden on the operator may increase and the operation time may increase in some cases.

One or more embodiments of the present invention may reduce the burden on an operator during a draw-out-operation and limit an increase in a draw-out-operation time, while securing the strength of an optical fiber cable by an inner sheath and an outer sheath.

An optical fiber cable according to one or more embodiments of the present invention may include a core in which a plurality of optical fibers are assembled, an inner sheath that accommodates the core therein, a pair of tension members that are embedded in the inner sheath so as to interpose the core therebetween, and an outer sheath that covers the inner sheath, in which the inner sheath is formed with a dividing portion that divides an inner peripheral surface and an outer peripheral surface of the inner sheath in a circumferential direction, and the dividing portion extends along a longitudinal direction in which the optical fiber extends.

According to one or more embodiments of the present invention, it is possible to reduce the burden on an operator during a draw-out-operation and to limit an increase in a draw-out-operation time, while securing the strength of an optical fiber cable by an inner sheath and an outer sheath.

DETAILED DESCRIPTION

Figure 1:
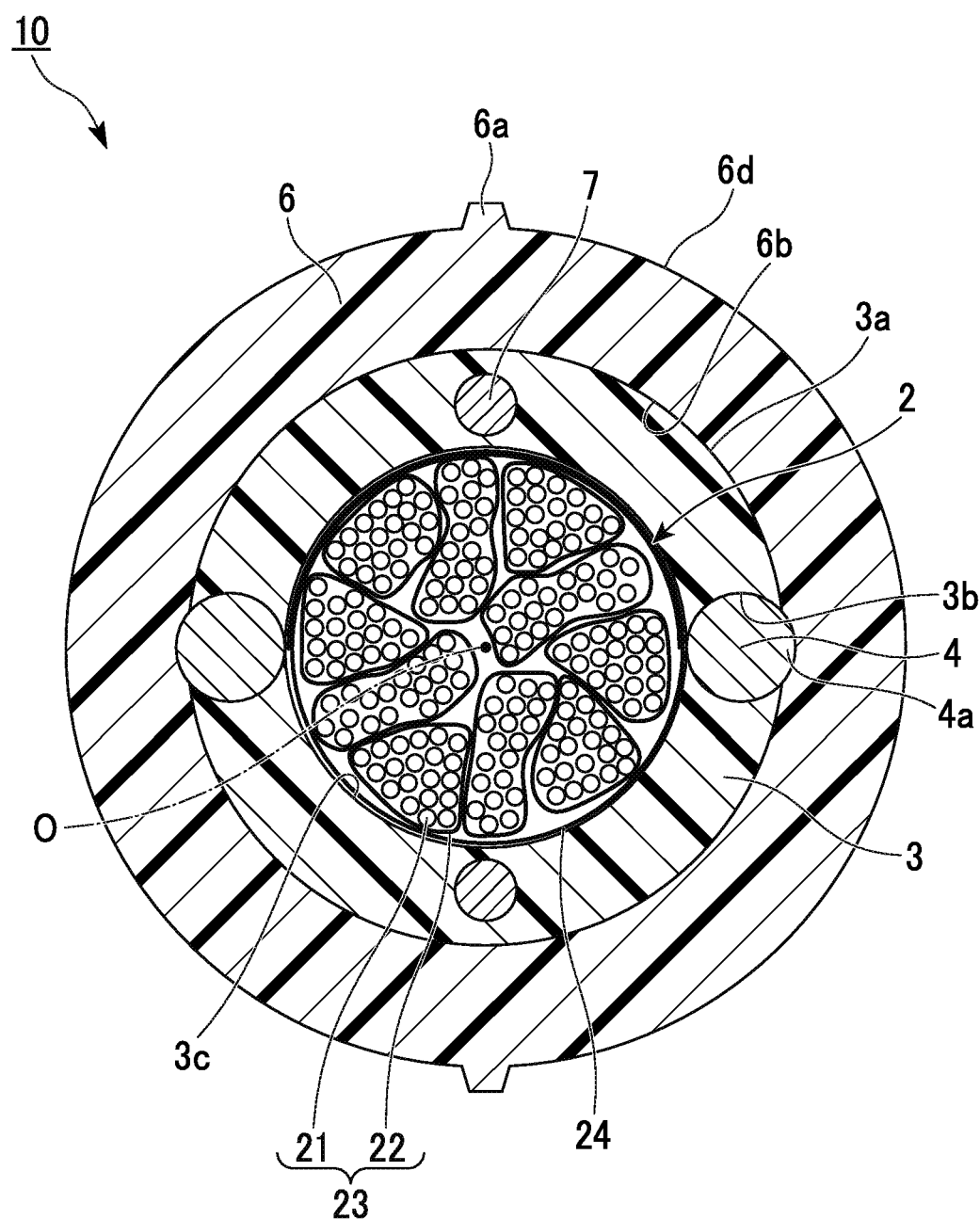
FIG. 1 is a cross-sectional view showing the structure of an optical fiber cable according to one or more embodiments.

The configuration of an optical fiber cable according to one or more embodiments will be described below with reference to FIGS. 1 and 2. In the drawings used in the following description, scales are appropriately changed in order to make it possible to recognize the shape of each constituent member.

As shown in FIG. 1, an optical fiber cable 10 includes a core 2 in which a plurality of optical fibers 21 are assembled, an inner sheath 3 that accommodates the core 2 therein, a pair of wire bodies 4 and a pair of tension members 7, which are embedded in the inner sheath 3, and an outer sheath 6 that covers the inner sheath 3.

(Direction Definition)

Here, in one or more embodiments, the inner sheath 3 and the outer sheath 6 are respectively formed in cylindrical shapes having a common central axis O, and the optical fiber 21 extends along the central axis O.

In one or more embodiments, a direction along the central axis O is referred to as a longitudinal direction. Further, in cross-sectional view as viewed from the longitudinal direction, a direction orthogonal to the central axis O is referred to as a radial direction, and a direction revolving around the central axis O is referred to as a circumferential direction.

The core 2 includes a plurality of optical fiber units 23 each having a plurality of optical fibers 21 separately, and a wrapping tube 24 wrapping the optical fiber units 23. In the illustrated example, each optical fiber unit 23 has twenty optical fibers 21, and the wrapping tube 24 wraps ten optical fiber units 23. As a result, the core 2 includes a total of 200 optical fibers 21. The number of the optical fibers 21 included in the core 2 may be appropriately changed. The wrapping tube 24 may be made of a material having water absorbing property, such as a water-absorbing tape, for example.

In the case where a material having water absorbing property is used as the wrapping tube 24, even when liquid such as water enters the vicinity of the optical fiber 21 from, for example, the dividing portion 3b of the inner sheath 3, which will be described later, the liquid can be absorbed by the wrapping tube 24.

The sectional shape of the core 2 in one or more embodiments is a circle, but without being limited thereto, it may be a non-circular shape such as an elliptical shape. It should be noted that the core 2 may not be provided with the wrapping tube 24.

The optical fiber unit 23 is called an intermittent adhesive-type tape core, and includes, for example, twenty optical fibers 21 and a binding material 22 that binds the optical fibers 21. As the optical fiber 21, an optical fiber core wire, an optical fiber element wire, or the like can be used. When a plurality of optical fibers 21 bound by the binding material 22 are pulled in a direction orthogonal to the extending direction thereof, the optical fibers 21 are adhered to each other so as to spread in a mesh form (spider web shape). Specifically, one optical fiber 21 is adhered to adjacent optical fibers 21 on both sides thereof at different positions in the longitudinal direction, and the adjacent optical fibers 21 are spaced apart from each other at a fixed interval in the longitudinal direction and are adhered to each other.

The mode of the optical fiber 21 included in the core 2 is not limited to the intermittent adhesive-type tape core, and may be changed as appropriate.

As the material of the inner sheath 3, polyolefin (PO) resin such as polyethylene (PE), polypropylene (PP), ethylene ethyl acrylate copolymer (EEA), ethylene vinyl acetate copolymer (EVA), and ethylene propylene copolymer (EP), polyvinyl chloride (PVC), or the like can be used.

In cross-sectional view, the inner peripheral surface 3c and the outer peripheral surface 3a of the inner sheath 3 are formed in a concentric shape with the central axis O as a center. Thus, the thickness of the inner sheath 3 in the radial direction is substantially uniform in the circumferential direction.

As the wire body 4, a cylindrical rod made of PP, nylon, or the like can be used. Alternatively, the wire body 4 may be formed of yarns in which fibers such as PP or polyester are twisted, and the wire body 4 may have water absorbing property.

The pair of wire bodies 4 are disposed so as to interpose the core 2 therebetween in the radial direction, and extends in the longitudinal direction in parallel to the core 2. The number of wire bodies 4 embedded in the inner sheath 3 may be one or three or more. In the case where three or more wire bodies 4 are embedded in the inner sheath 3, by disposing the respective wire bodies 4 at equal intervals in the circumferential direction, each wire body 4 can be disposed at a position symmetrical to the core 2.

As the material of the tension member 7, for example, a metal wire (such as steel wire), a tension fiber (such as aramid fiber), FRP or the like can be used.

The pair of tension members 7 are disposed so as to interpose the core 2 therebetween in the radial direction, and extends in the longitudinal direction in parallel to the core 2. Further, the pair of tension members 7 is disposed at equal intervals in the radial direction from the core 2. Thus, in cross-sectional view, the positions where the tension members 7 are disposed are symmetrical with the core 2 interposed therebetween. Therefore, it is possible to prevent a bias of stress from occurring in the optical fiber cable 10 due to temperature change or the like, and to prevent the optical fiber cable 10 from being unintentionally and unnecessarily twisted.

The number of tension members 7 embedded in the inner sheath 3 may be one or three or more.

In the case where three or more tension members 7 are embedded in the inner sheath 3, by disposing the respective tension members 7 at equal intervals in the radial direction from the core 2, and at equal intervals in the circumferential direction, the respective tension members 7 can be disposed at positions symmetrical to the core 2. For example, in the case where the number of tension members 7 is four, two pairs of tension members 7 each may be embedded in the inner sheath 3 so as to interpose the core 2 therebetween.

Further, in one or more embodiments, a pair of tension members 7 and a pair of wire bodies 4 are embedded in the inner sheath 3 such that the intervals in the circumferential direction between the tension members 7 and the wire bodies 4, which are adjacent to each other in the circumferential direction, are equal to each other.

As the material of the outer sheath 6, PO resin such as PE, PP, EEA, EVA, and EP, PVC, or the like can be used.

On the outer peripheral surface of the outer sheath 6, a pair of projections (marked portions) 6a extending along the longitudinal direction is formed. The projection 6a and the tension member 7 are disposed at substantially the same position in the circumferential direction. Since the projection 6a is used for aligning the position of the tool K as described later, other forms may be adopted. For example, the projection 6a may be a recessed portion recessed radially inward from the outer peripheral surface 6d of the outer sheath 6, marking by paint, or the like.

In cross-sectional view, the inner peripheral surface 6b and the outer peripheral surface 6d of the outer sheath 6 are formed in a concentric shape with the central axis O as a center. Thus, the thickness of the outer sheath 6 in the radial direction is substantially uniform in the circumferential direction. The inner peripheral surface 6b of the outer sheath 6 is in contact with the outer peripheral surface 3a of the inner sheath 3 without a gap. The inner peripheral surface 6b of the outer sheath 6 and the outer peripheral surface 3a of the inner sheath 3 are not in close contact with each other. Alternatively, the inner peripheral surface 6b of the outer sheath 6 may be stuck to the outer peripheral surface 3a of the inner sheath 3 with a weak force to be easily peeled off.

Capsaicin or the like may be contained in the material forming the outer sheath 6. In this case, it is possible to prevent the animal such as a mouse from chewing the outer sheath 6.

Here, the inner sheath 3 of one or more embodiments of the present embodiment is formed with a dividing portion 3b for dividing the inner peripheral surface 3c and the outer peripheral surface 3a of the inner sheath 3 in the circumferential direction. The dividing portion 3b extends along the longitudinal direction.

More specifically, in one or more embodiments, a pair of wire bodies 4 is in contact with the core 2 along the longitudinal direction. Thus, the inner peripheral surface 3c of the inner sheath 3 is divided along the longitudinal direction. Further, the diameter of the wire body 4 is larger than the radial thickness of the inner sheath 3. Thus, the outer peripheral surface 3a of the inner sheath 3 is divided along the longitudinal direction by the wire bodies 4. The wire bodies 4 is adjacent to the dividing portion 3*b* of the inner sheath 3. The radially outer end portion 4*a*, which is a part of the wire body 4, is located radially outward of the outer peripheral surface 3*a* of the inner sheath 3. Further, the pair of wire bodies 4 is arranged at equal intervals around the core 2. The pair of dividing portions 3*b* is formed in the inner sheath 3 at equal intervals in the circumferential direction.

In order to form the dividing portion 3*b* in the inner sheath 3, the inner sheath 3 may be formed around the core 2 in a state in which the wire bodies 4 are longitudinally attached to the core 2. In this case, in cross-sectional view, the contour of the dividing portion 3*b* and the contour of the wire body 4 coincide.

Next, the operation of the optical fiber cable 10 configured as described above will be described.

Figure 2:
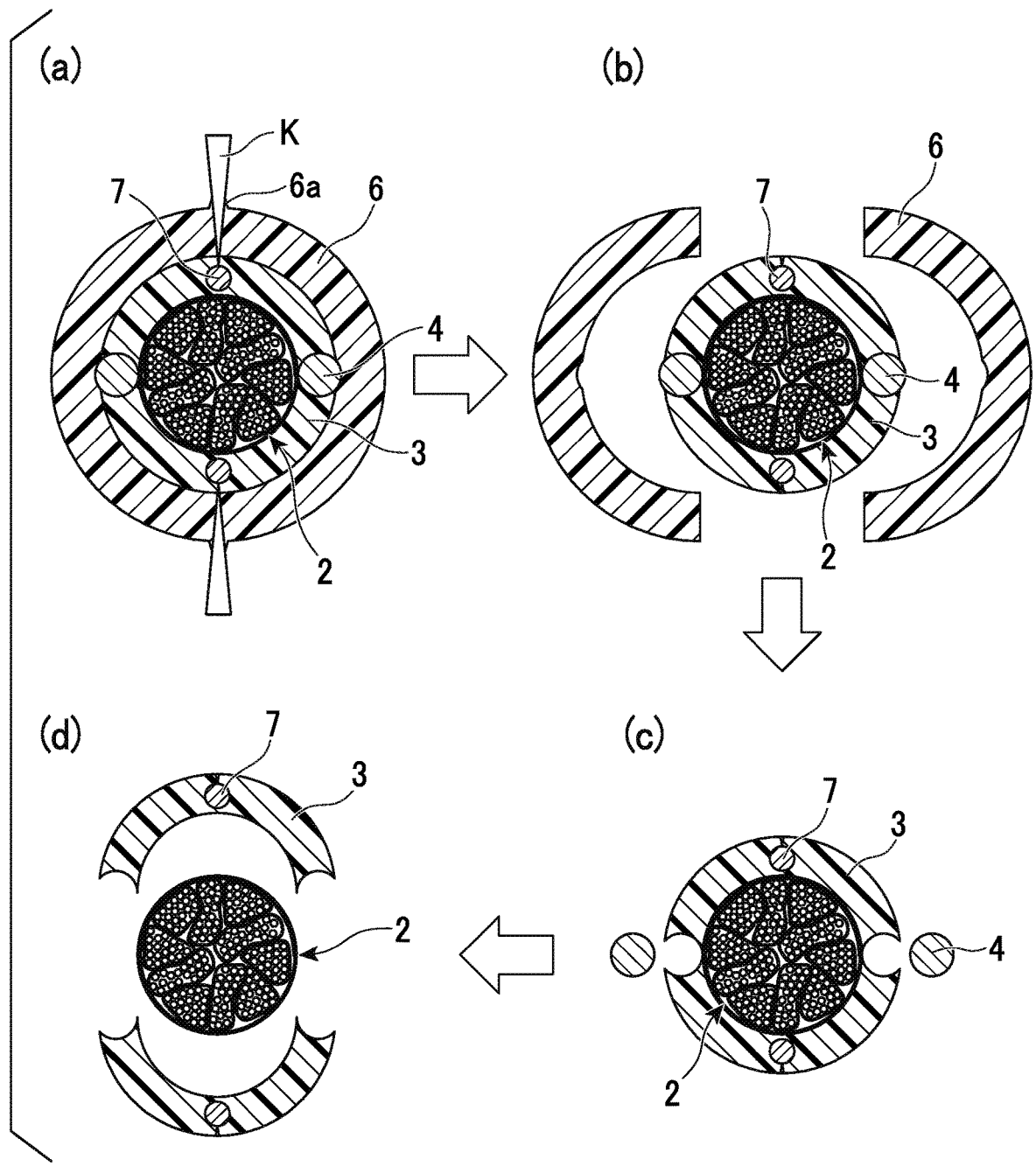
FIGS. 2(a)-2(d) are explanatory views showing steps of drawing out the optical fiber cable shown in FIG. 1 according to one or more embodiments.

When drawing out the optical fiber cable 10, as shown in part (a) of FIG. 2, first, the tip of the tool K such as a blade is aligned with the position of the projection 6*a*, and the outer sheath 6 is incised. At this time, the tip of the tool K abuts against the tension member 7, preventing the tool K from entering radially inward beyond the position of the tension member 7. When the outer sheath 6 is incised by the tool K as shown in part (b) of FIG. 2, the pair of wire bodies 4 can be easily removed from the inner sheath 3, as shown in part (c) of FIG. 2. This is because the inner peripheral surface 3*c* and the outer peripheral surface 3*a* of the inner sheath 3 are divided along the longitudinal direction by the wire bodies 4. As the pair of wire bodies 4 is removed, the inner sheath 3 is divided as shown in part (d) of FIG. 2. Thus, the core 2 is exposed, and the draw-out-operation is completed.

Although the optical fiber 21 is wound by the wrapping tube 24, the wrapping tube 24 is a water-absorbing tape or the like, so it easily breaks and can be easily removed.

Next, the result of comparative experiment on the times required for the draw-out-operation in the optical fiber cable 10 of one or more embodiments and the optical fiber cable of the comparative example will be described.

Example 1

In the present comparative experiment, a 200-core optical fiber cable 10 (Example 1) having the structure as shown in FIG. 1 is prepared as the optical fiber cable 10 of one or more embodiments.

Comparative Example

Figure 10:
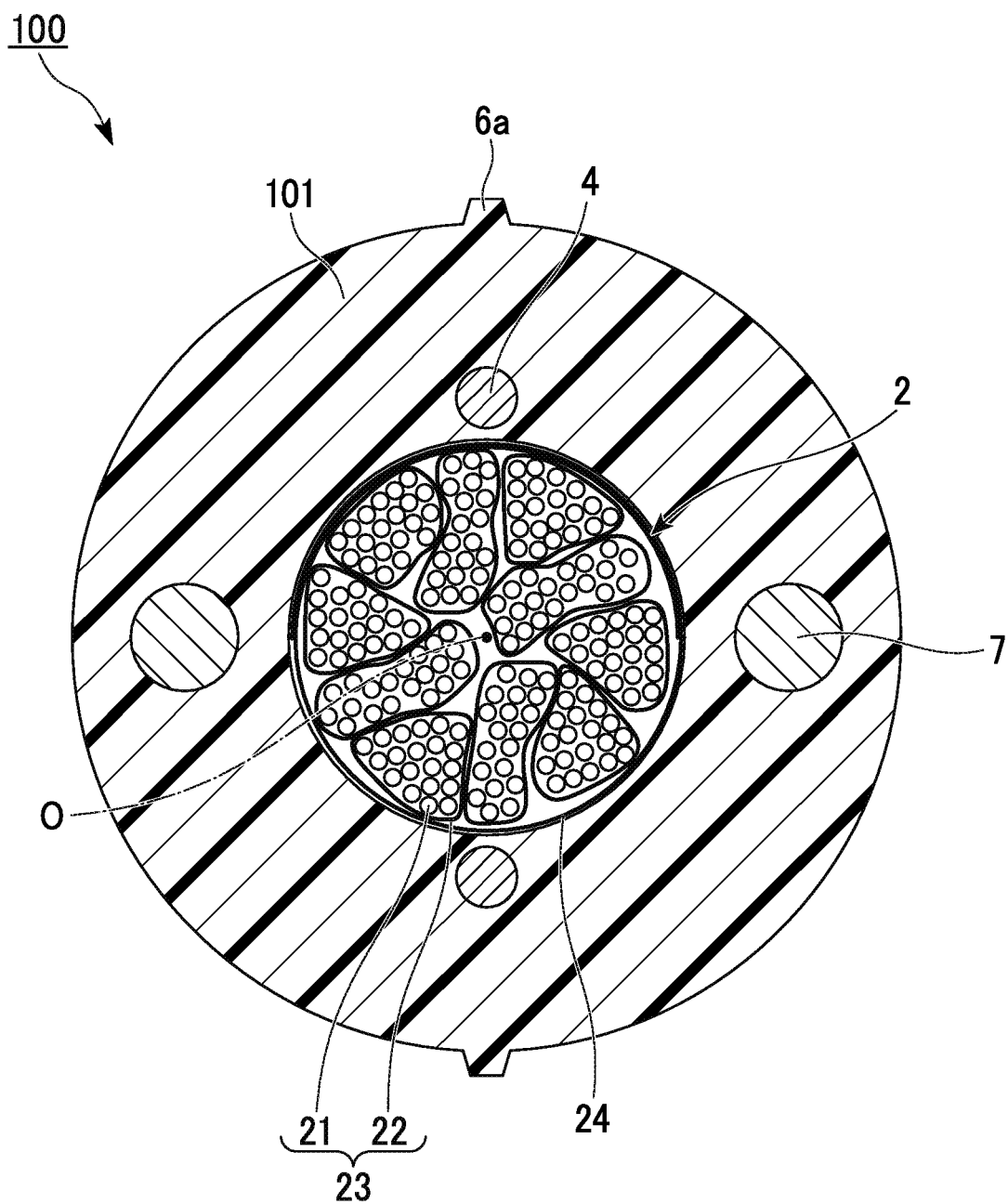
FIG. 10 is a cross-sectional view showing the structure of an optical fiber cable of a comparative example.

As the optical fiber cable 100 of the comparative example, a high density-type optical fiber cable as shown in FIG. 10 is prepared. The optical fiber cable 100 includes a core 2, a sheath 101 covering the core 2, a pair of wire bodies 4 and tension members 7 embedded in the sheath 101. The core 2 is the same as the core 2 in one or more embodiments. The radial thickness of the sheath 101 is equivalent to the sum of the thickness of the inner sheath 3 and the thickness of the outer sheath 6 of Example 1. Thus, the outer diameter of the optical fiber cable 100 of the comparative example is equal to that of the optical fiber cable 10 of Example 1. On the outer peripheral surface of the sheath 101, a pair of projections 6*a* similar to the projection 6*a* of one or more embodiments is formed. The pair of wire bodies 4 in the comparative example are disposed at the same positions as the pair of projections 6*a* in the circumferential direction.

In the draw-out-operation of the optical fiber cable 100 in the comparative example, a tool such as a blade is aligned with the position of the projection 6*a* and is inserted, the sheath 101 is incised with a tool such as a blade, and the wire body 4 is partially drawn out. Then, by pulling the pair of wire bodies 4 toward the radially outward direction, the sheath 101 is torn and the core 2 is drawn out.

The result of relative comparison of the outer diameters, the weights, and the draw-out-operation times for the core 2 between the optical fiber cable 100 of the comparative example and the optical fiber cable 10 of Example 1 is shown in Table 1 below.

The numerical values of the outer diameter, the weight, and the operation time shown in Table 1 indicate the relative values when the numerical value in the optical fiber cable 100 of the comparative example is 1.

TABLE 1

| ITEM | Comparative Example | Example 1 |
|---|---|---|
| OUTER DIAMETER | 1 | 1 |
| WEIGHT | 1 | 1 |
| DRAW-OUT-OPERATION TIME FOR CORE | 1 | 0.25 |

*The relative values obtained when the numerical values in comparative example are 1

As shown in Table 1, the outer diameters and the weights are the same in the comparative example and Example 1, but the draw-out-operation time for the core 2 in Example 1 is greatly reduced than that in the comparative example when comparing the draw-out-operation times. This is because the optical fiber cable 10 of Example 1 has a smaller attention required for the operator and work load than the optical fiber cable 100 of the comparative example.

In other words, in the optical fiber cable 100 of the comparative example, it is necessary to tear the sheath 101 by pulling the wire body 4 with a large force, in addition to paying attention in order for the blade not to enter radially inward beyond the position of the wire body 4 and damage the optical fiber 21.

On the other hand, in the optical fiber cable 10 of Example 1, since the blade abuts against the tension member 7, the blade is prevented from entering radially inward beyond the position of the tension member 7. Further, when the outer sheath 6 is incised, the wire body 4 is easily removed from the inner sheath 3, the inner sheath 3 is divided, and the core 2 can be easily drawn out.

As described above, according to the optical fiber cable 10 of one or more embodiments, the inner sheath 3 is formed with the dividing portion 3*b* dividing the inner peripheral surface 3*c* and the outer peripheral surface 3*a* of the inner sheath 3 in the circumferential direction, and the dividing portion 3*b* extends along the longitudinal direction. With this configuration, when the outer sheath 6 is incised and removed, the inner sheath 3 can be easily opened with the dividing portion 3*b* as a starting point, and the core 2 can be drawn out. Thus, even in a case where the strength of the optical fiber cable 10 is secured by the inner sheath 3 and the outer sheath 6, it is not necessary to pull the wire body 4 with a large force like the optical fiber cable 100 of the comparative example during the draw-out-operation, and it is possible to limit an increase in the operation time while reducing the burden on the operator.

Further, since the optical fiber cable 10 is provided with the wire body 4 in contact with the core 2 along the longitudinal direction, and the diameter of the wire body 4 is larger than the thickness of the inner sheath 3 in the radial direction, the wire body 4 reliably divides the inner peripheral surface 3c and the outer peripheral surface 3a of the inner sheath 3 along the longitudinal direction. This makes it possible to more reliably reduce the burden on the operator at the time of a draw-out-operation.

Furthermore, when manufacturing the optical fiber cable 10, the dividing portion 3b can be easily formed in the inner sheath 3, by forming the inner sheath 3 around the core 2 in a state in which the wire bodies 4 are longitudinally attached to the core 2.

Further, since the projection 6a and the tension member 7 are disposed at substantially the same position in the circumferential direction, when the outer sheath 6 is incised by inserting a tool such as a blade along the projection 6a, the blade abuts against the tension member 7, so the blade is prevented from entering further radially inward. Thus, for example, it is possible to prevent the blade from unintentionally penetrating the inner sheath 3 and reaching the core 2 and damaging the optical fiber 21, thereby alleviating the attention required for the operator.

Further, since the thicknesses of the inner sheath 3 and the outer sheath 6 in the radial direction are substantially uniform, it is possible to prevent the optical fiber cable 10 from being unintentionally and unnecessarily twisted, while preventing a locally weak portion to the side pressure from being generated in the optical fiber cable 10.

Next, one or more embodiments according to the present invention will be described, but the basic configuration is the same as that of one or more other embodiments. Therefore, the same reference numerals are given to similar configurations, the explanation thereof will be omitted, and only differences will be described.

The optical fiber cable 20 of one or more embodiments may be different from other embodiments in that the wire body 4 is not provided and the form of the dividing portion 3b of the inner sheath 3 is changed.

Figure 3:
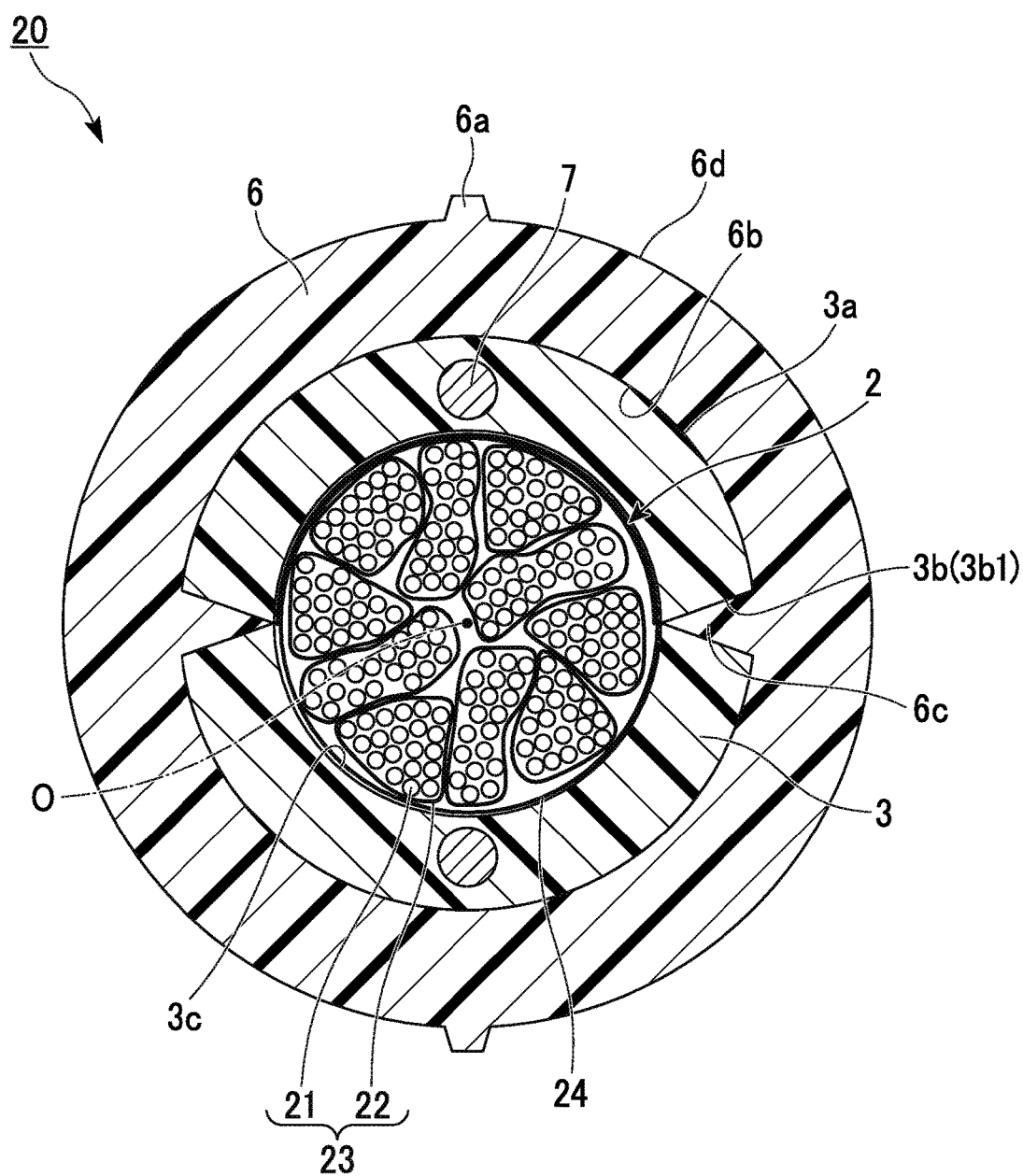
FIG. 3 is a cross-sectional view showing the structure of an optical fiber cable according to one or more embodiments.

As shown in FIG. 3, the optical fiber cable 20 of one or more embodiments does not have the wire body 4. Further, in one or more embodiments, the dividing portion 3b is formed in a V-shaped groove shape extending radially inward from the outer peripheral surface 3a of the inner sheath 3. That is, the dividing portion 3b has a groove-shaped portion 3b1. The groove-shaped dividing portion 3b extends along the longitudinal direction. Thus, the outer peripheral surface 3a of the inner sheath 3 is divided along the longitudinal direction. The dividing portion 3b reaches the inner peripheral surface 3c of the inner sheath 3. Thus, the inner peripheral surface 3c of the inner sheath 3 is divided along the longitudinal direction.

In the example shown in FIG. 3, the width of the dividing portion 3b in the circumferential direction gradually decreases toward the radially inward direction. Further, a pair of dividing portions 3b are formed in the inner sheath 3 so as to interpose the core 2 therebetween in the radial direction.

The shape and the number of the dividing portions 3b to be disposed, and the like can be appropriately changed. For example, the dividing portion 3b may be formed in a rectangular shape or may be formed in a slit shape in cross-sectional view. In addition, one or three or more dividing portions 3b may be formed in the inner sheath 3.

Further, on the inner peripheral surface 6b of the outer sheath 6 of one or more embodiments, a fitting portion 6c extending along the longitudinal direction is formed. The fitting portion 6c protrudes radially inward from the inner peripheral surface 6b of the outer sheath 6 and is fitted into the dividing portion 3b. The width of the fitting portion 6c in the circumferential direction gradually decreases toward the radially inward direction. In cross-sectional view, the contour of the fitting portion 6c is formed to be equal to the contour of the dividing portion 3b. A pair of the fitting portions 6c is formed on the inner peripheral surface 6b of the outer sheath 6 at equal intervals in the circumferential direction.

In the case of manufacturing the optical fiber cable 20, the dividing portion 3b may be formed at the same time when the inner sheath 3 is formed, or the dividing portion 3b may be formed by post-processing. By covering the periphery of the inner sheath 3 on which the dividing portion 3b is formed with the outer sheath 6, it is possible to form the outer sheath 6 having the fitting portion 6c to be fitted into the dividing portion 3b.

Next, the result of comparative experiment on the time required for the draw-out-operation in the optical fiber cable 20 of one or more embodiments and the optical fiber cable of the comparative example will be described.

Example 2

In the present comparative experiment, a 200-core optical fiber cable 20 (Example 2) having the structure as shown in FIG. 3 is prepared as the optical fiber cable 20 of one or more embodiments.

In the present comparative experiment, the outer diameters, the weights, and the draw-out-operation times for the core 2 are compared between the optical fiber cable 100 of the comparative example used in the comparative experiment of one or more embodiments and the optical fiber cable 20 of Example 2. The results of this comparison are shown in Table 2 below. The numerical values of the outer diameter, the weight, and the operation time shown in Table 2 indicate the relative values when the numerical value in the optical fiber cable 100 of the comparative example is 1.

TABLE 2

| ITEM | Comparative Example | Example 1 |
| --- | --- | --- |
| OUTER DIAMETER | 1 | 1 |
| WEIGHT | 1 | 1.04 |
| DRAW-OUT-OPERATION TIME FOR CORE | 1 | 0.25 |

*The relative values obtained when the numerical values in comparative example are 1

As shown in Table 2, the outer diameters and the weights are substantially the same in the comparative example and Example 2, but the draw-out-operation time for the core 2 in Example 2 is greatly reduced than that in the comparative example when comparing the draw-out-operation times. This is because, similarly to the optical fiber cable 10 of Example 1, the optical fiber cable 20 of Example 2 has a smaller attention required for the operator and a smaller burden on the operator than the optical fiber cable 100 of the comparative example.

As described above, according to the optical fiber cable 20 of one or more embodiments, the fitting portion 6c to be fitted into the dividing portion 3b formed in the groove shape is formed on the inner peripheral surface 6b of the outer sheath. Therefore, even in a case where a side pressure acts on a portion of the optical fiber cable 20 where the dividing portion 3b is disposed, the outer sheath 6 and the inner sheath 3 can be integrated to receive the side pressure. This makes it possible to limit the deformation of the inner sheath 3 such that the dividing portion 3b expands in the circumferential direction, for example, and to enhance the strength against the side pressure of the optical fiber cable 20.

Next, one or more embodiments according to the present invention will be described, but the basic configuration may be the same as one or more other embodiments. Therefore, the same reference numerals are given to similar configurations, the explanation thereof will be omitted, and only differences will be described.

Figure 4:
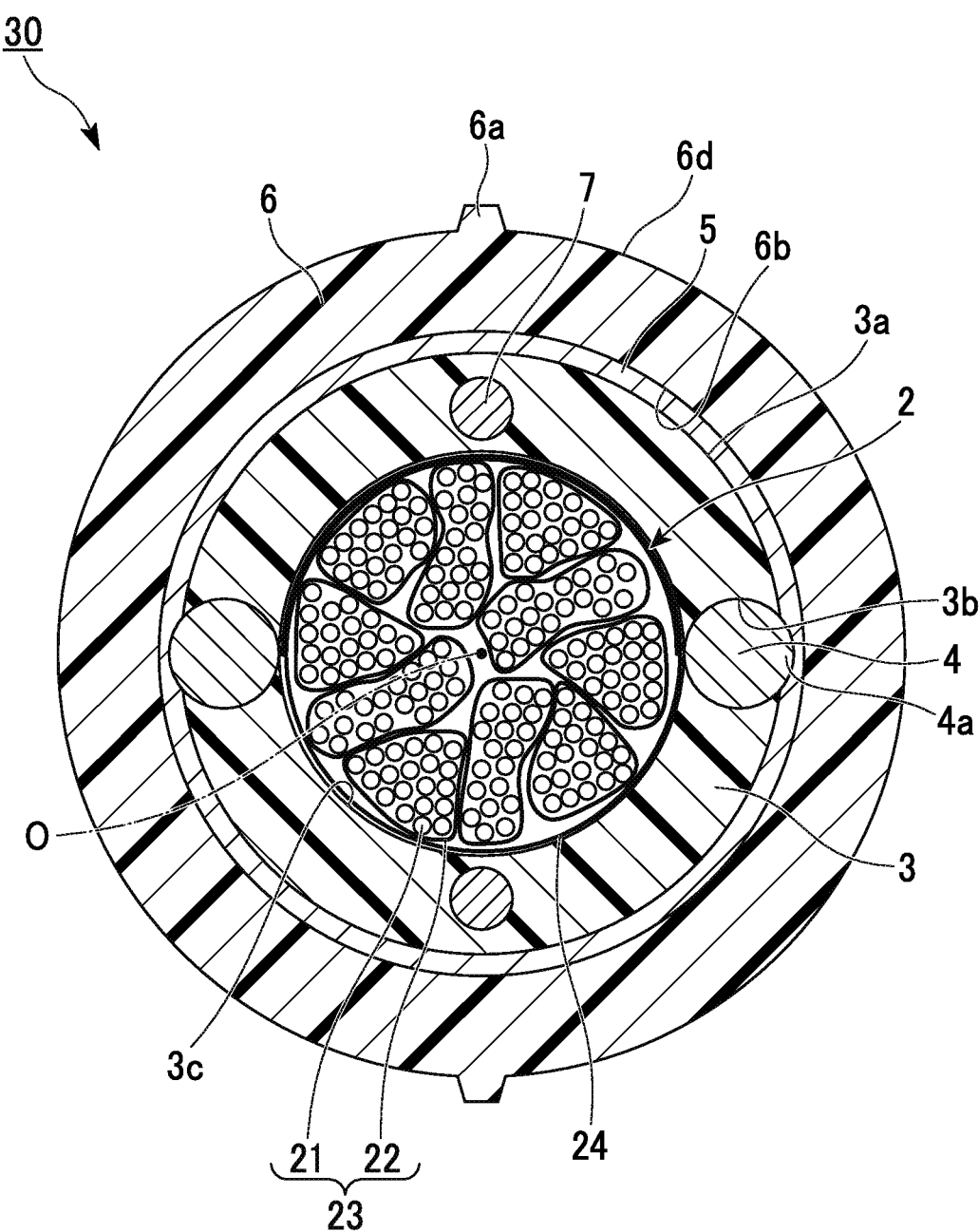
FIG. 4 is a cross-sectional view showing the structure of an optical fiber cable according to one or more embodiments.

As shown in FIG. 4, in the optical fiber cable 30 of one or more embodiments, the water-absorbing tape 5 is disposed between the inner sheath 3 and the outer sheath 6. Further, the wrapping tube 24 of one or more embodiments is formed of a material having a water absorbing property.

According to the optical fiber cable 30 of one or more embodiments, since the wrapping tube 24 is made of a material having water absorbing property, for example, even in a case where liquid such as water enters the vicinity of the core 2 from the dividing portion 3*b* of the inner sheath 3, the liquid can be absorbed by the wrapping tube 24.

Further, the water-absorbing tape 5 disposed between the inner sheath 3 and the outer sheath 6 absorbs liquid such as water. Thus, for example, even when the liquid enters the outer sheath 6, it is possible to prevent the liquid from entering the vicinity of the core 2 from the dividing portion 3*b* of the inner sheath 3.

Next, one or more embodiments according to the present invention will be described, but the basic configuration may be the same as that of one or more other embodiments. Therefore, the same reference numerals are given to similar configurations, the explanation thereof will be omitted, and only difference will be described.

Figure 5:
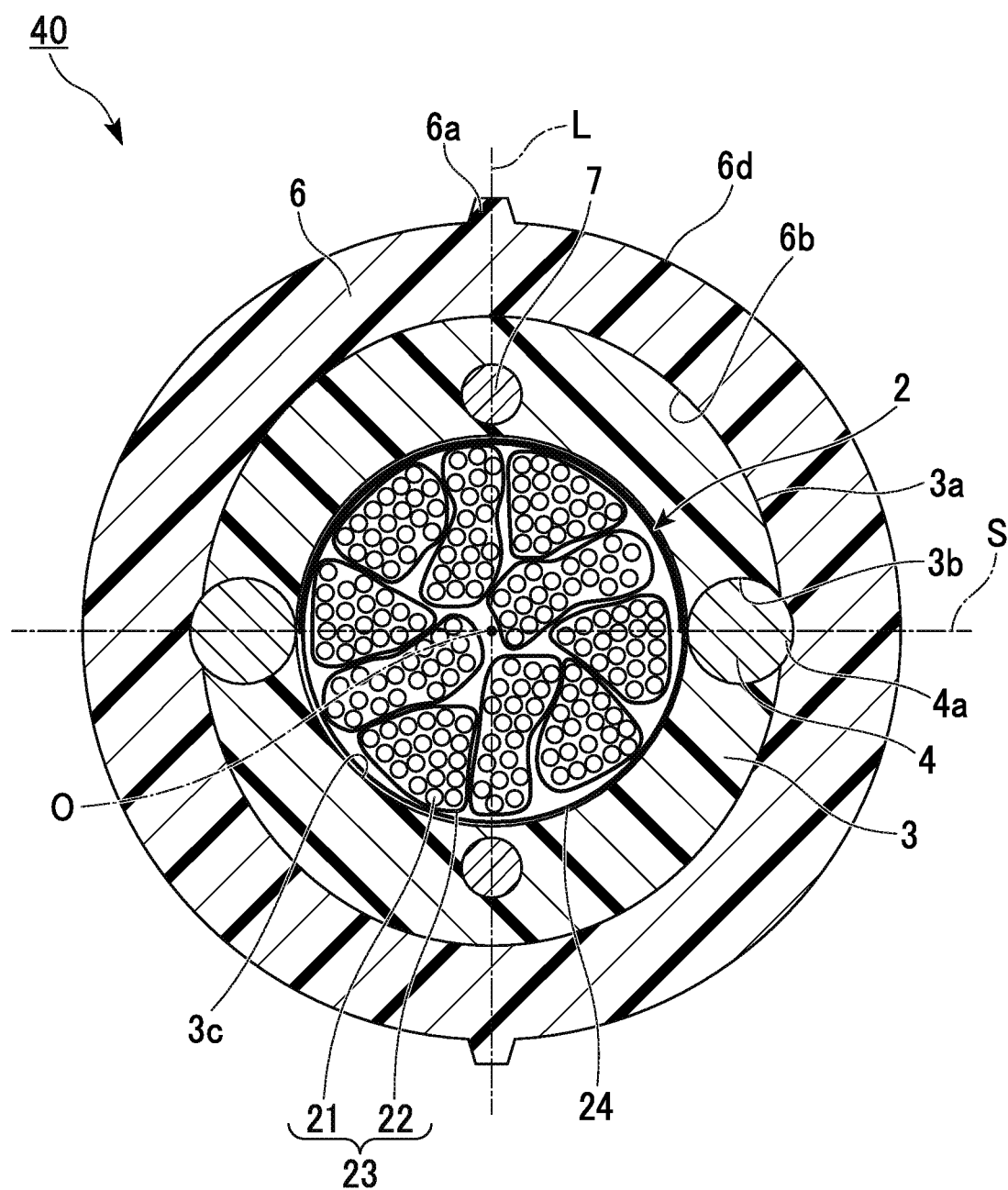
FIG. 5 is a cross-sectional view showing the structure of an optical fiber cable according to one or more embodiments.

As shown in FIG. 5, in the optical fiber cable 40 of one or more embodiments, the inner sheath 3 is formed in a substantially elliptical shape in cross-sectional view. More specifically, the inner sheath 3 is formed in a substantially elliptical shape in which the major axis L is located on the pair of tension members 7 and the minor axis S is located on the pair of dividing portions 3*b* of the inner sheath 3. In cross-sectional view, the major axis L and the minor axis S are orthogonal to each other in the vicinity of the central axis O.

The inner peripheral surface 6*b* of the outer sheath 6 is formed in an elliptical shape equivalent to the outer peripheral surface 3*a* of the inner sheath 3, and the outer peripheral surface 6*d* of the outer sheath 6 is formed in a substantially circular shape.

According to the optical fiber cable 40 of one or more embodiments, since the thickness of the inner sheath 3 at the portion where the tension member 7 is located is increased, it is difficult to reliably embed the tension member 7 in the inner sheath 3. Further, since the thickness of the outer sheath 6 in the vicinity of the portion of the inner sheath 3 where the dividing portion 3*b* is formed is increased, it is possible to compensate for the decrease in the strength of the entire optical fiber cable 40 in the dividing portion 3*b*.

Next, one or more embodiments according to the present invention will be described, but the basic configuration may be the same as that of one or more other embodiments. Therefore, the same reference numerals are given to similar configurations, the explanation thereof will be omitted, and only difference will be described.

Figure 6:
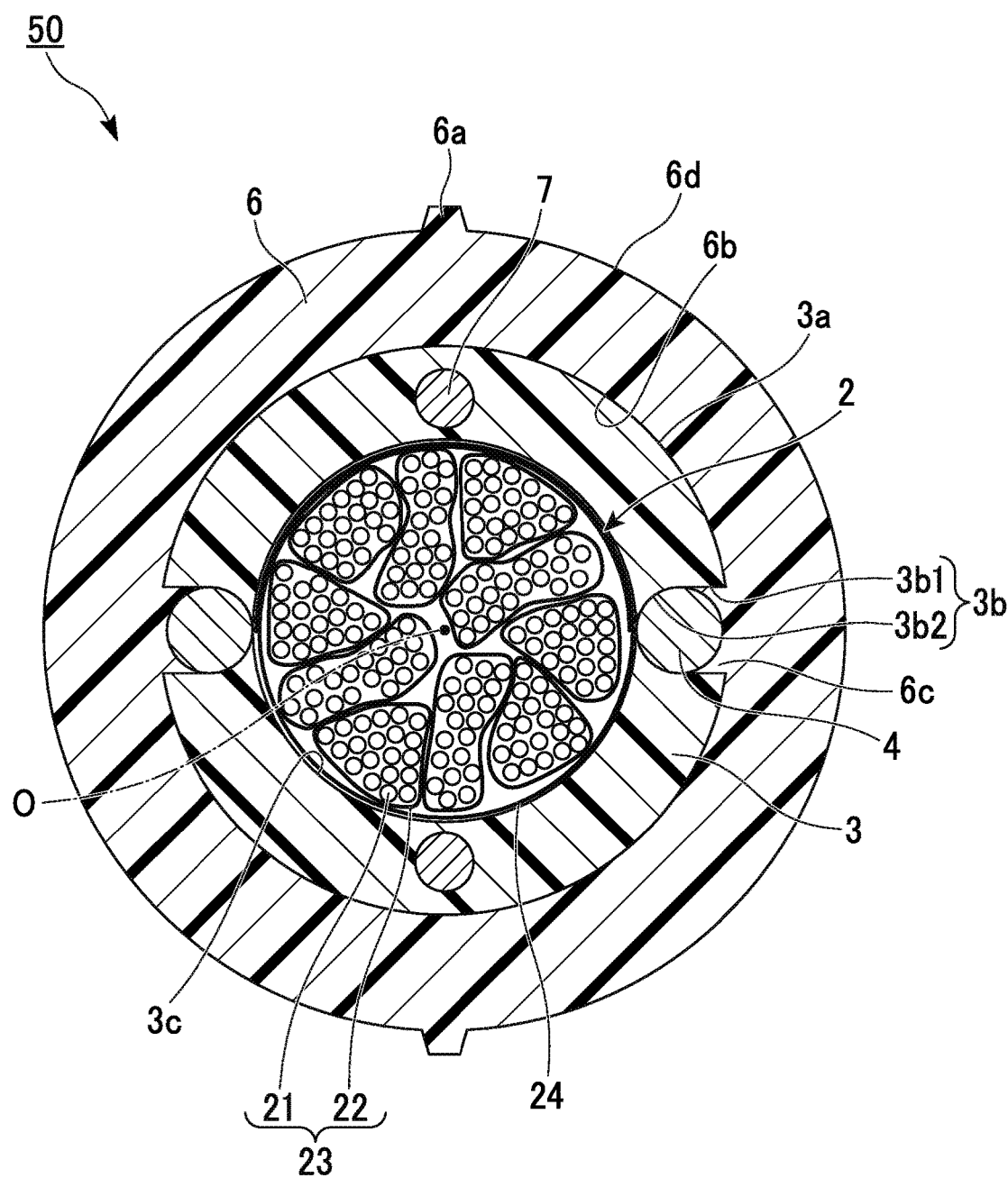
FIG. 6 is a cross-sectional view showing the structure of an optical fiber cable according to one or more embodiments.

As shown in FIG. 6, in the optical fiber cable 50 of one or more embodiments, the dividing portion 3*b* has a groove-shaped portion 3*b*1 and an inner portion 3*b*2 positioned radially inward of the groove-shaped portion 3*b*1. The groove-shaped portion 3*b*1 is formed in a groove shape recessed radially inward from the outer peripheral surface 3*a* of the inner sheath 3. The inner portion 3*b*2 is adjacent to the wire body 4. The groove-shaped portion 3*b*1 and the inner portion 3*b*2 extend along the longitudinal direction.

Since the pair of wire bodies 4 is in contact with the core 2 along the longitudinal direction, the inner peripheral surface 3*c* of the inner sheath 3 is divided along the longitudinal direction by the inner portion 3*b*2. Thus, the outer peripheral surface 3*a* of the inner sheath 3 is divided along the longitudinal direction by the groove-shaped portion 3*b*1.

A fitting portion 6*c* projecting radially inward is formed on the inner peripheral surface 6*b* of the outer sheath 6. The fitting portion 6*c* is fitted into the groove-shaped portion 3*b*1. A radially inner end portion of the fitting portion 6*c* is in contact with the radially outer end surface of the wire body 4. The fitting portion 6*c* covers the wire body 4 from the outside in the radial direction.

In one or more embodiments, the fitting portion 6*c* is formed of the same material as that of the outer sheath 6, and is formed integrally with the outer sheath 6. However, the fitting portion 6*c* may be formed of a material different from that of the outer sheath 6. Further, the fitting portion 6*c* may be separate from the outer sheath 6. In the case where the fitting portion 6*c* is made of a material different from the outer sheath 6 or is made separately from the outer sheath 6, the fitting portion 6*c* may be made of a material having a melting point lower than that of the outer sheath 6 so as to be integrated with the outer sheath 6. In a case where the material of the fitting portion 6*c* has a lower melting point than that of the outer sheath 6, when the outer sheath 6 is covered, the fitting portion 6*c* and the outer sheath 6 are thermally fused and integrated. Further, irregularities may be formed on the surface of the fitting portion 6*c* in contact with the outer sheath 6 such that the outer sheath 6 and the fitting portion 6*c* are brought into close contact with each other. In this case, when the outer sheath 6 is extruded, the resin as the outer sheath 6 enters the irregularities on the surface of the fitting portion 6*c*, and the fitting portion 6*c* and the outer sheath 6 can be integrated.

Figure 7:
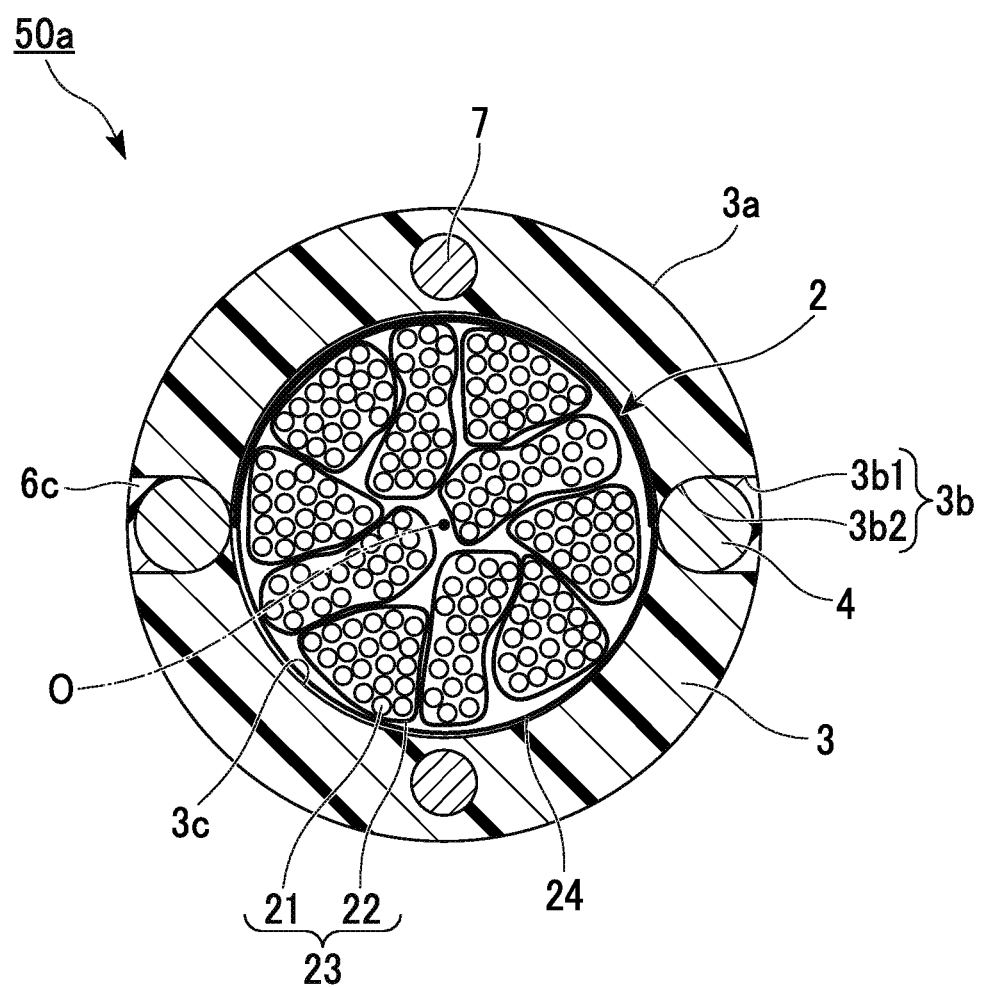
FIG. 7 is a cross-sectional view showing the structure of an intermediate unit of the optical fiber cable according to one or more embodiments.

Next, a method for manufacturing the optical fiber cable 50 will be described. The method for manufacturing the optical fiber cable 50 according to one or more embodiments has a step of obtaining the intermediate unit 50*a* shown in FIG. 7 and a step of forming the outer sheath 6 covering the intermediate unit 50*a*.

The intermediate unit 50*a* is obtained by forming the inner sheath 3 covering the core 2 and the pair of tension members 7, and the fitting portion 6*c*, in a state in which the pair of wire bodies 4 is longitudinally attached to the core 2. The optical fiber cable of one or more embodiments shown in FIG. 6 is manufactured, through the step of forming the outer sheath 6 covering the intermediate unit 50*a*, after obtaining the intermediate unit 50*a*. In one or more embodiments, since the material of the fitting portion 6*c* and the material of the outer sheath 6 are the same, when forming the outer sheath 6, the fitting portion 6*c* and the outer sheath 6 are brought into close contact with each other and integrated.

Next, the operation of the optical fiber cable 50 configured as described above will be described.

Figure 8:
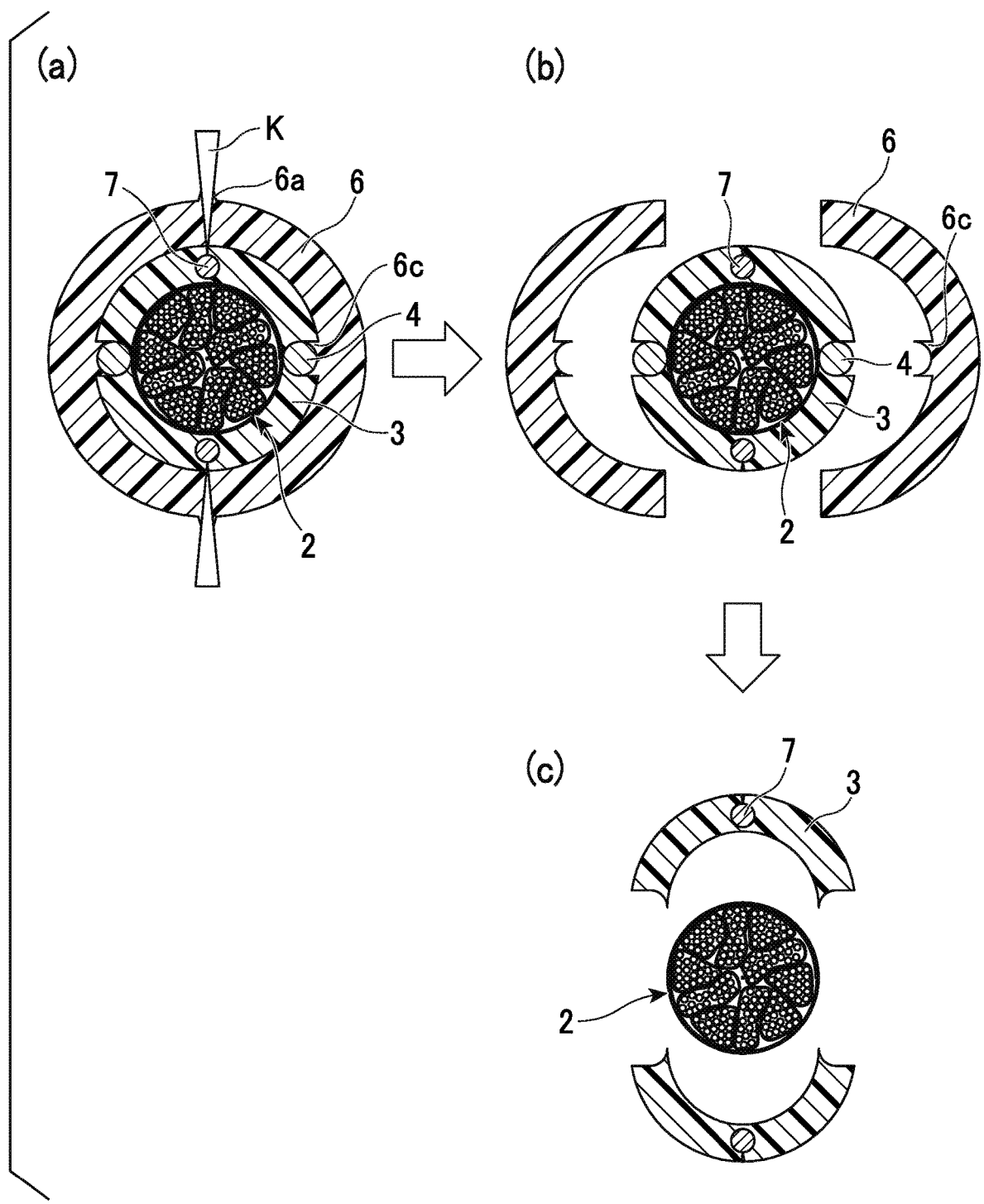
FIGS. 8(a)-8(c) are explanatory views showing steps of drawing out the optical fiber cable shown in FIG. 6 according to one or more embodiments.

When drawing out the optical fiber cable 50, as shown in part (a) of FIG. 8, first, the tip of the tool K such as a blade is aligned with the position of the projection 6*a*, and the outer sheath 6 is incised. At this time, the tip of the tool K abuts against the tension member 7, preventing the tool K from penetrating radially inward beyond the position of the tension member 7. When the outer sheath 6 is incised by the tool K as shown in part (b) of FIG. 8, the fitting portion 6*c* integrally formed with the outer sheath 6 can be removed together with the outer sheath 6. Further, as shown in part (c) of FIG. 8, by removing the pair of wire bodies 4 from the inner sheath 3, the inner sheath 3 is naturally divided. Thus, the core 2 is exposed, and the draw-out-operation is completed.

As described above, the dividing portion 3b in one or more embodiments has the groove-shaped portion 3b1 to which the fitting portion 6c is fitted, and the inner portion 3b2 to which the wire body 4 is adjacent. With this configuration, even in the case of using the wire body 4 having a diameter smaller than the thickness of the inner sheath 3, the draw-out-operation can be easily performed.

Furthermore, since the fitting portion 6c covers the wire body 4 from the outside in the radial direction, for example, even in a case where the position of the core 2 deviates from the central axis O when the inner sheath 3 is formed, the wire body 4 is prevented from falling off from the inner sheath 3 in the stage of forming the intermediate unit 50a. Therefore, the optical fiber cable 50 can be manufactured more easily.

Even if the intermediate unit 50a is immersed in a water tank for cooling the inner sheath 3 after extruding the inner sheath 3, water is prevented from permeating into the wire body 4.

Further, by forming the outer sheath 6 after obtaining the intermediate unit 50a, a time required for cooling the inner sheath 3 and the outer sheath 6 can be reduced, for example, as compared with a case where the inner sheath 3 and the outer sheath 6 are simultaneously extruded. Therefore, it is possible to increase the production line speed of the optical fiber cable 50 and to shorten the length of the cooling water tank.

It should be noted that the technical scope of the present invention is not limited to the above-described embodiments, and various modifications can be made without departing from the spirit of the present invention.

For example, in the above-described embodiments, the pair of dividing portions 3b may be formed in the inner sheath 3 at equal intervals in the circumferential direction, but the present invention is not limited thereto. For example, one dividing portion 3b may be formed or three or more dividing portions 3b may be formed in cross-sectional view.

In the above embodiments, the dividing portion 3b and the tension member 7 of the inner sheath 3 may be disposed at symmetrical positions with respect to the core 2. However, the present invention is not limited thereto, and these members may be disposed at positions asymmetrical to the core 2 in cross-sectional view.

Figure 9:
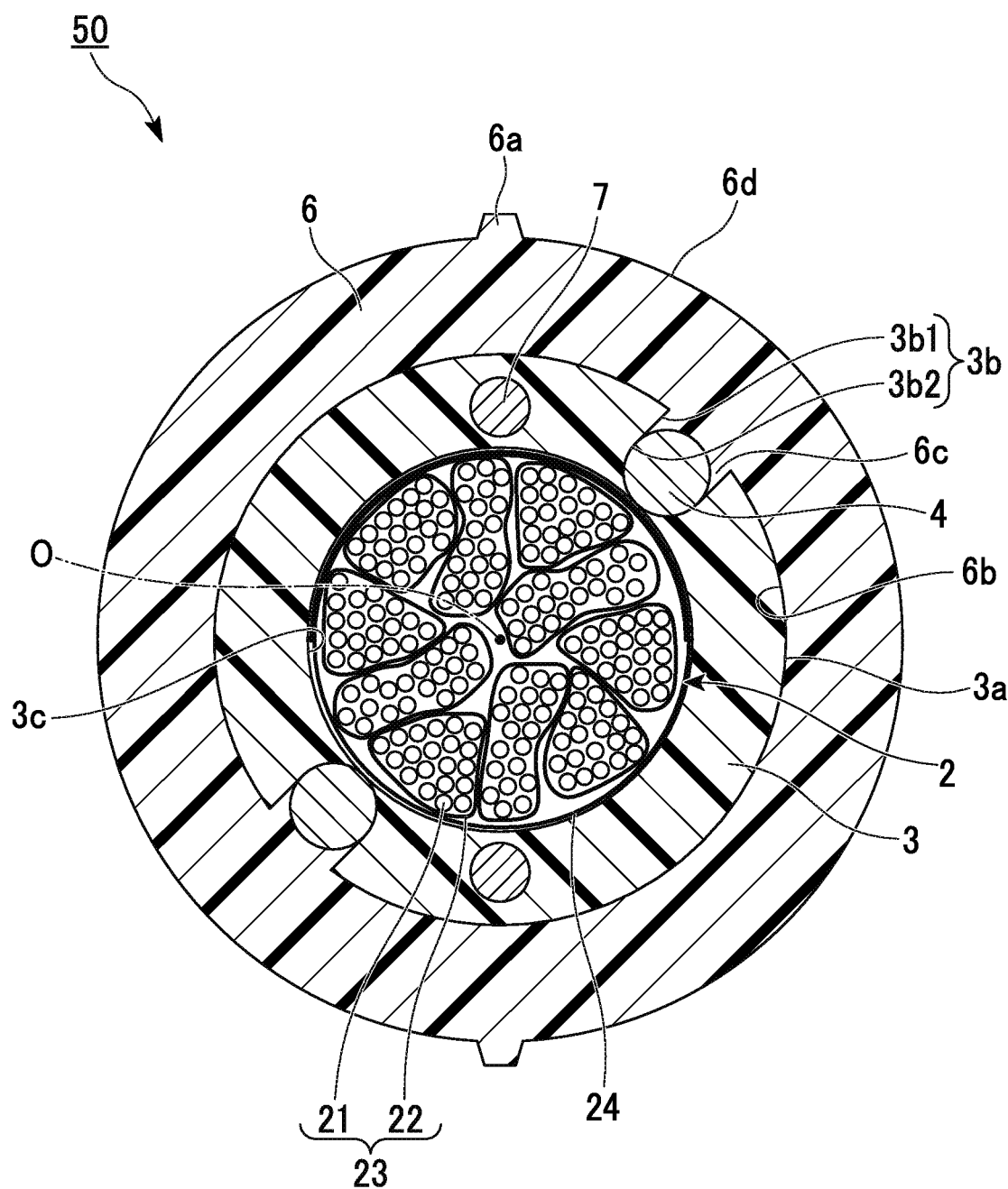
FIG. 9 is a cross-sectional view showing the structure of an optical fiber cable according to a modification example of one or more embodiments.

Further, the arrangement of the wire body 4 and the dividing portion 3b in one or more embodiments may be appropriately changed. For example, as shown in FIG. 9, a configuration in which the tension members 7 and the wire bodies 4 are not arranged at equal intervals in the circumferential direction, in cross-sectional view may be adopted.

Further, in one or more embodiments, the material of the fitting portion 6c may be different from that of the outer sheath 6. In this case, in order to remove the fitting portion 6c together with the outer sheath 6 (see part (b) of FIG. 8), the peeling force at the time of peeling the fitting portion 6c from the outer sheath 6 may be set to be larger than the force at the time of drawing out the fitting portion 6c from the groove-shaped portion 3b1.

Besides, without departing from the spirit of the present invention, it is possible to appropriately replace the constituent elements in the above-described one or more embodiments with well-known constituent elements, and the above-described one or more embodiments and modification example may be appropriately combined.

For example, by combining embodiments, the wire body 4 may not be disposed, the inner sheath 3 may be formed with a groove-shaped dividing portion 3b, and the water-absorbing tape 5 disposed between the inner sheath 3 and the outer sheath 6 may cover the dividing portion 3b. In this case, the water-absorbing tape 5 covers the dividing portion 3b, which prevents the liquid such as water that has entered the outer sheath 6 from entering the vicinity of the core 2 through the groove-shaped dividing portion 3b. Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF THE REFERENCE SYMBOLS 10, 20, 30, 40, 50 OPTICAL FIBER CABLE
50A INTERMEDIATE UNIT
2 CORE
3 INNER SHEATH
3b DIVIDING PORTION
3b1 GROOVE-SHAPED PORTION
3b2 INNER PORTION
4 WIRE BODY
5 WATER-ABSORBING TAPE
6 OUTER SHEATH
6a PROJECTION (MARKED PORTION)
6c FITTING PORTION
7 TENSION MEMBER
24 WRAPPING TUBE
100 OPTICAL FIBER CABLE (COMPARATIVE EXAMPLE)
L MAJOR AXIS
S MINOR AXIS

What is claimed is:

1. An optical fiber cable comprising:
a core comprising an assembled plurality of optical fibers;
an inner sheath that accommodates the core therein;
a pair of tension members that are embedded in the inner sheath and that are disposed on opposite sides of the core; and
an outer sheath that covers the inner sheath,
wherein the inner sheath comprises a pair of dividing portions that divides an inner peripheral surface and an outer peripheral surface of the inner sheath in a circumferential direction,
wherein the dividing portions extend along a longitudinal direction in which the optical fiber cable extends,
wherein the tension members and the dividing portions are disposed alternately in the circumferential direction, and
the optical fiber cable further comprises a pair of wire bodies that contact the core along the longitudinal direction.

2. The optical fiber cable according to claim 1, wherein the wire bodies are adjacent to the dividing portions, and at least a part of the wire bodies is located radially outward of the outer peripheral surface of the inner sheath.

3. The optical fiber cable according to claim 1,
wherein the dividing portions each have a groove-shaped portion that is formed in a groove shape recessed radially inward from the outer peripheral surface of the inner sheath, and
wherein the outer sheath comprises a plurality of fitting portions, each of which extends along the longitudinal direction and fits into the groove-shaped portion.

4. The optical fiber cable according to claim 3,
wherein the dividing portions each have:
the groove-shaped portion; and
an inner portion positioned radially inward of the groove-shaped portion, and
wherein the inner portion is adjacent to each of the wire bodies.

5. The optical fiber cable according to claim 1,
wherein a pair of marked portions extending along the longitudinal direction is formed on an outer peripheral surface of the outer sheath, and
wherein the marked portions and the tension members are disposed at equal positions in the circumferential direction.

6. The optical fiber cable according to claim 1,
wherein the core comprises a wrapping tube that wraps the plurality of optical fibers, and
wherein the wrapping tube is formed of a water-absorbing material.

7. The optical fiber cable according to claim 6,
wherein a water-absorbing tape is disposed between the inner sheath and the outer sheath.

8. The optical fiber cable according to claim 1,
wherein the inner sheath is formed in an elliptical shape in which a major axis passes through a pair of the tension members in cross-sectional view and a minor axis passes through the dividing portions, and
wherein an outer peripheral surface of the outer sheath is formed in a circular shape in cross-sectional view.

9. A method for manufacturing an optical fiber cable, comprising:
obtaining an intermediate unit by forming an inner sheath that covers a core and a pair of tension members, and fitting portions that cover a pair of wire bodies in contact with the core along a longitudinal direction from outside in a radial direction and are each fitted into a groove-shaped portion extending radially inward from an outer peripheral surface of the inner sheath; and
forming an outer sheath that covers the intermediate unit,
wherein the tension members and the wire bodies are disposed alternately in a circumferential direction.

10. The optical fiber cable according to claim 1,
wherein the inner peripheral surface and the outer peripheral surface of the inner sheath are formed in a concentric shape.

11. The optical fiber cable according to claim 1,
wherein intervals in the circumferential direction between the tension members and the dividing portions are equal to each other.

12. The optical fiber cable according to claim 3,
wherein the fitting portion is integrally formed with the outer sheath.

* * * * *